Sept. 13, 1966     R. J. PURTELL     3,272,438
IRRIGATION SYSTEM
Filed March 12, 1964     4 Sheets-Sheet 1

RUFUS J. PURTELL
INVENTOR.

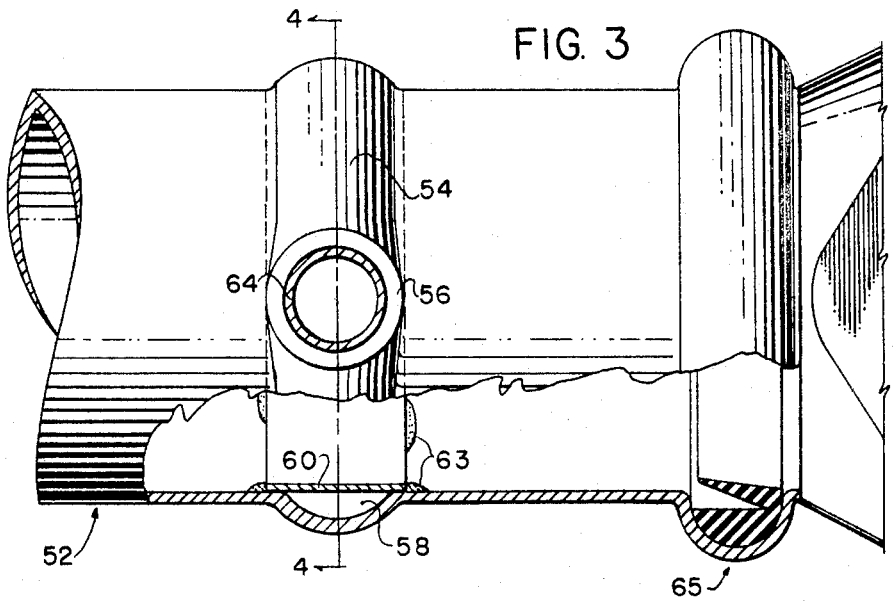
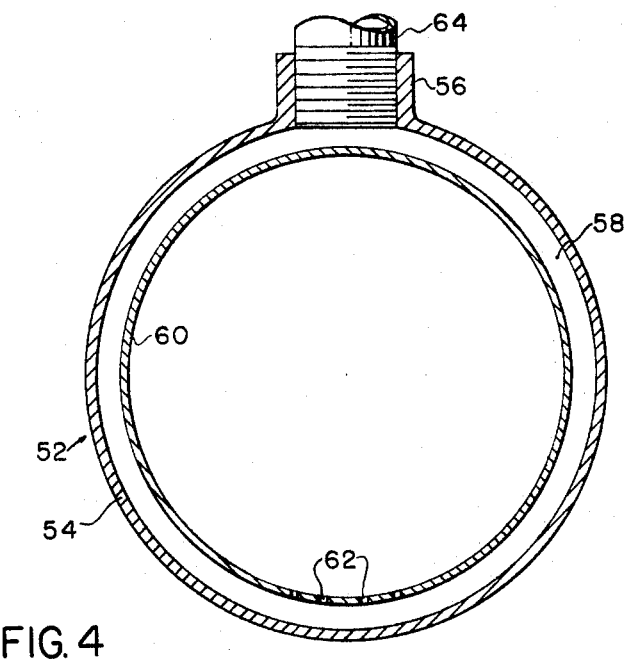

Sept. 13, 1966   R. J. PURTELL   3,272,438
IRRIGATION SYSTEM
Filed March 12, 1964   4 Sheets-Sheet 3
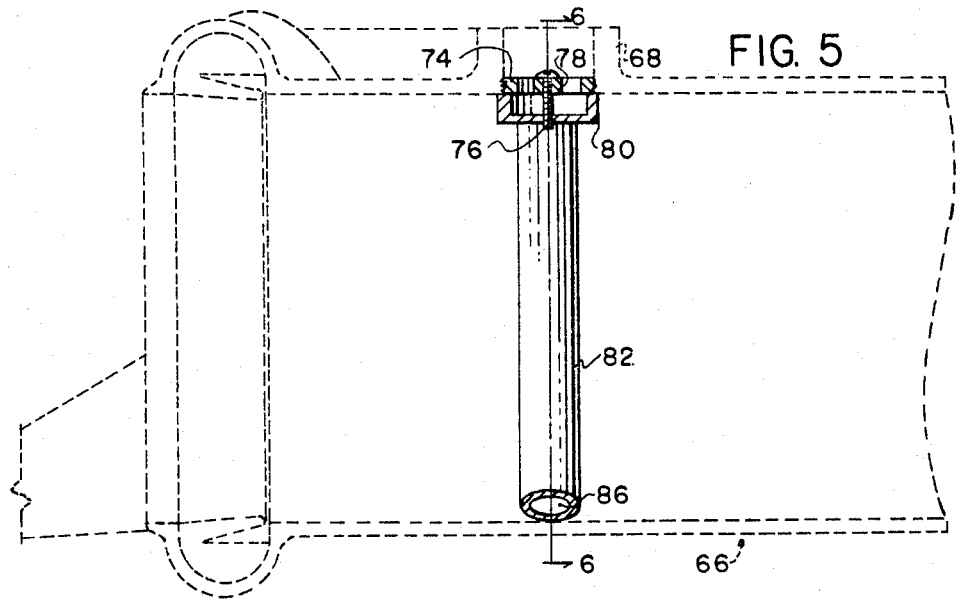
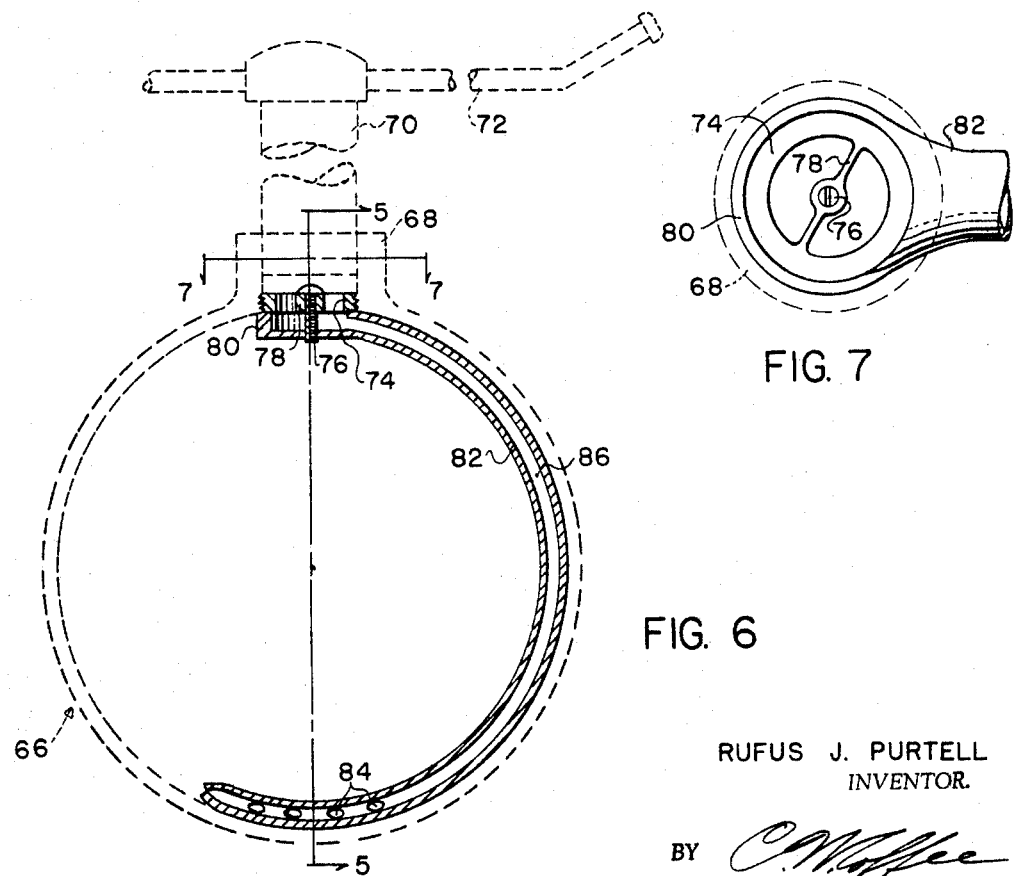
RUFUS J. PURTELL
INVENTOR.
BY *C. W. Coffee*
Atty.

Sept. 13, 1966   R. J. PURTELL   3,272,438
IRRIGATION SYSTEM
Filed March 12, 1964   4 Sheets-Sheet 4
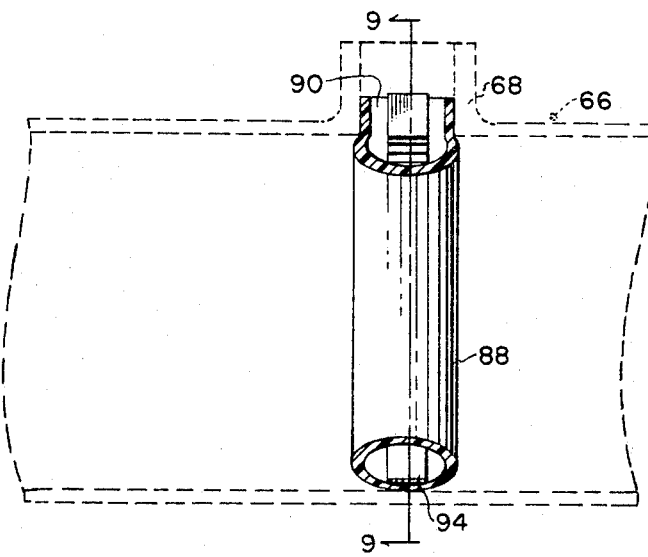
FIG. 8
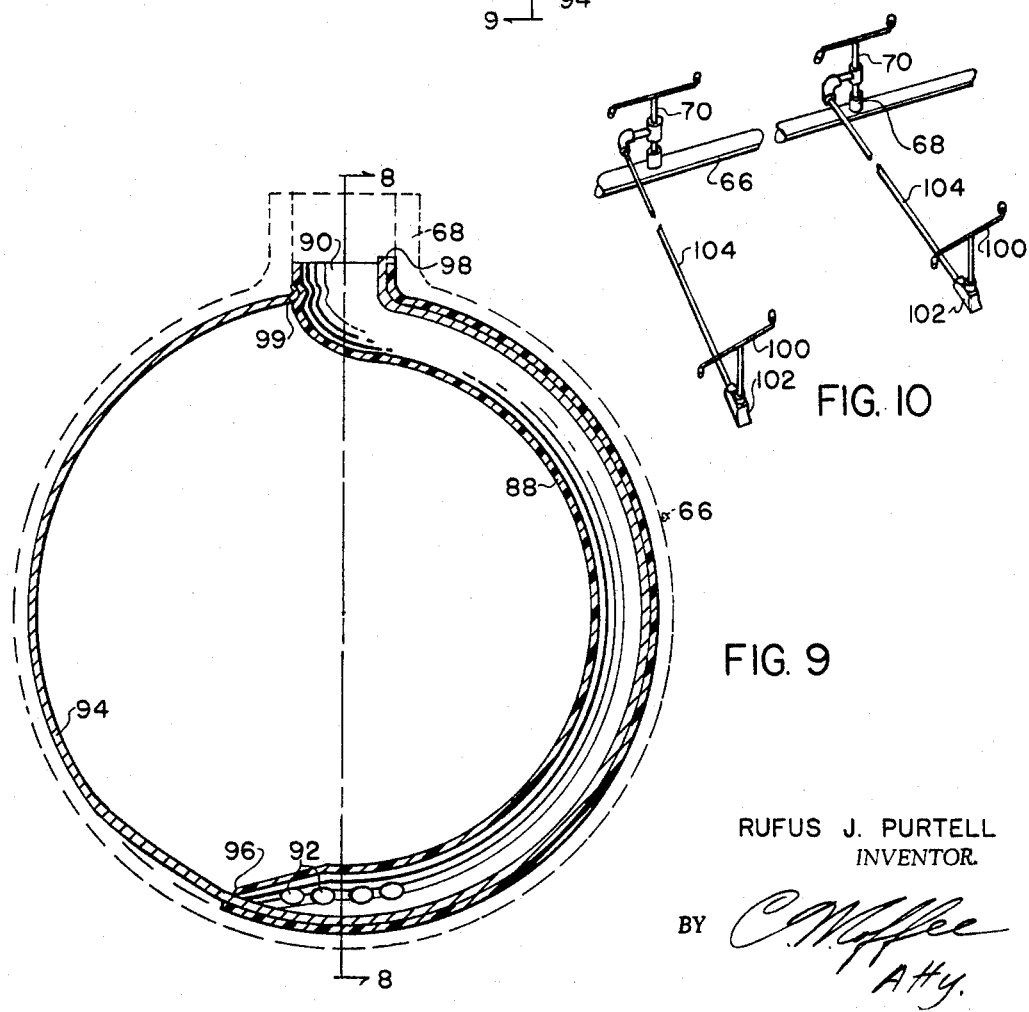
FIG. 10
FIG. 9
RUFUS J. PURTELL
INVENTOR.
BY C. W. McFee
Atty.

United States Patent Office 3,272,438
Patented Sept. 13, 1966

3,272,438
IRRIGATION SYSTEM
Rufus J. Purtell, Brownfield, Tex., assignor, by mesne assignments, to The J. B. Knight Co., Inc., Brownfield, Tex., a corporation of Texas
Filed Mar. 12, 1964, Ser. No. 351,338
7 Claims. (Cl. 239—212)

This invention relates to agricultural irrigation and more particularly to preventing sand from accumulating within sprinkler pipes.

Today, much of the agricultural land of the United States is irrigated by pumping water through pipes with sprinklers attached thereto. Much of the water contains sand, particularly water from certain underground aquifers. The grains of sand are denser or heavier than the water and therefore, when the sand is moving down a horizontal pipe, the sand will be at the bottom of the pipe. So long as their is sufficient velocity of water, the sand will flow with the water stream. However, toward the end of the system, there is insufficient velocity of water to move the sand, and it settles to the bottom of the pipe. If the pipe is supported above the ground by vehicles, the excessive weight of the sand can destroy the pipe. When the pipe is moved by hand it is necessary to remove the sand from the pipe because of weight. The sand is often removed by disconnecting an end plug from the pipe while the water is flowing therethrough, thus permitting the water to wash the sand from the pipe. This is undersirable because it is time consuming and makes a muddy place in the field.

Most of the sand which accumulates in the pipe is fine enough that it will move through the sprinklers. If the sand can ever be moved into the sprinklers, it will flow out through the sprinklers and be discharged thereby preventing an accumulation within the pipe. The water is drawn from the top of the pipe and there is no withdrawal of sand from the pipe.

My invention and solution to this problem is to draw water from the bottom of the pipe so that any sand which is in the water stream is removed from the pipe before it accumulates within the pipe.

An object of this invention is to prevent the accumulation of sand in pipes in agricultural irrigation systems.

Another object is to prevent the accumulation of dense grains of material in fluid systems.

Another object of this invention is to provide a device that can be inserted into existing pipes without any change in the pipe which will prevent the accumulation of sand within the pipe.

A further object is to prevent the accumulation of sand and to provide means for draining the water from the pipes in such a manner that the ground is not eroded by the water draining from the pipe.

A still further object is to provide for the removal of sand from the pipe without obstructing the flow of water through the pipe.

A still further object is to provide for a screen so that gravel too large to pass through the sprinkler will remain in the pipe and not clog the sprinkler.

Still further objects are to achieve the above with a device that is sturdy, compact, durable, simple, and reliable, yet inexpensive and easy to manufacture and operate.

Still further objects are to achieve the above with a method that is inexpensive and automatic.

The specific nature of the invention as well as other objects, uses, and advantages thereof will clearly appear from the following description and from the accompanying drawing, the different views of which are not necessarily to the same scale, in which:

FIG. 3 is a plan view partially broken away of a pipe illustrating a second embodiment of this invention.

FIG. 4 is a sectional view taken on line 4—4 of FIG. 3.

FIG. 5 is a sectional view of a third embodiment of this invention taken on line 5—5 of FIG. 6 with the pipe shown in broken lines.

FIG. 6 is a cross sectional view taken on line 6—6 of FIG. 5.

FIG. 7 is a plan view of a part of the embodiment of FIGS. 5 and 6 taken on line 7—7 of FIG. 6.

FIG. 8 is a sectional view of a fourth embodiment of this invention, taken on line 8—8 of FIG. 9 with the pipe shown in broken lines.

FIG. 9 is a sectional view taken on line 9—9 of FIG. 8.

FIG. 10 is a perspective view of a system utilizing the embodiments of FIGS. 3–9.

Figures 1, 2:
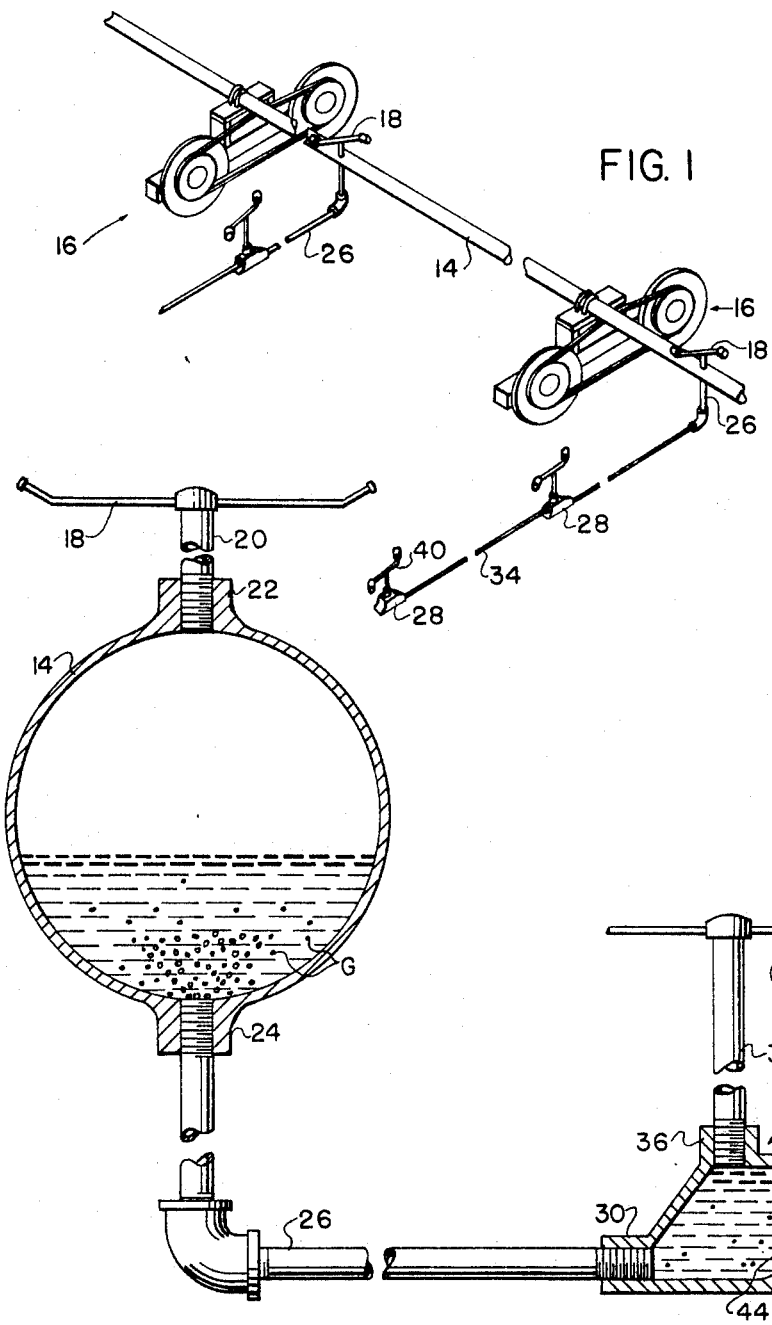
FIG. 1 is a perspective view of a system according to this invention showing parts diagrammatically, with parts foreshortened.
FIG. 2 is a cross sectional view of pipe as used in embodiment of FIG. 1.

Referring more particularly to FIGS. 1 and 2, of the drawings, there has been represented an irrigation system having a pipe 14 adapted to carry water under pressure. Although a source of supply of water under pressure has not been shown, one exists.

Vehicles 16 have been represented diagrammatically inasmuch as vehicles for miving irrigation pipe are well known. The pipe 14 is supported above the ground by vehicles 16. The height at which the pipe 14 is supported above the ground will vary according to type vehicle, but generally, it is supported high enough to clear growing crops and therefore, at least four or five feet above the ground.

A plurality of sprinklers 18 are each on top of a riser 20. The risers 20 are threaded into threaded connections 22 located on the top of the pipe 14. It will be noted that the diameter of the pipe 14 is several times greater than the diameter of the riser 20, usually five or six times greater in standard practice.

The velocity of the water in the pipe 14 is insufficient to carry grains of sand to the inlet of the riser 20 and therefore, no sand is removed from the pipe by the riser 20 as depicted in FIG. 2. However, if a grain of sand enters the riser 20, the velocity of the water through the riser is great enough to carry the sand along with the water stream and it would be discharged through the sprinkler 18 were it to ever enter the riser 20.

According to one embodiment of my invention, a second threaded connection 24 is provided at the bottom of the pipe 14 at each connection 22. Therefore, it may be seen that any grains of a dense material such as sand G within the pipe 14 will flow out through the trail tube 26 which is connected into the threaded connection 24. As may be seen, the lumen of the pipe is straight and unobstructed at this area.

On each of the trail tubes 26, there are one or more connectors 28. Each connector 28 is adapted to slide along the ground. Each connector has a threaded inlet 30 by which the connector 28 is attached to the forward trail tube 26. Also, each connector 28 has a rear threaded outlet 32 by which the connector is connected to an extension 34 of the trail tube unless the connector is the last connector in series, at which time, a blank plug is threaded into the outlet 32. Threaded connection 36 is at the top of the connector 28. Riser 38 is threaded into the threaded connection 36 and discharge opening or sprinkler 40 is on the top of the riser 38. The diameter of the pipe 14 is several times larger than the diameter of the trail tube 26, usually five or six times greater in standard practice. The velocity of the water stream within the trail tube 26 is sufficient that any sand entering therein is carried in the water stream up and into the riser 38 and is passed through the sprinkler 40 and therefore, is disposed of and does not accumulate.

Drain valve 44 extends through hole 46 in the arcuate rear section 42 of the connector 28. Drain valves of this type are well known to the art and commercially available on the market. Valve 44 will close the opening 46 when there is pressure in the connector 28 of the trail tube 26, and the pipe 14. However, if the pressure is released on the pipe 14, the natural resilience of the material (rubber) of the valve 44 will cause it to spring away from the arcuate surface 42 allowing water to drain from the system. The hole 46 is located immediately above foot 48 which is an extension of the bottom of the connector 28. Webs 50 extend on either side of the foot 48 to give it strength.

It will be understood that if automatic drain valves like the valve 44 were placed in the pipe 14, which is located four or five feet above the ground, when the valves open the water running from the valve onto the ground erodes the ground. However, when the valve 44 located in the connector 28 opens, it does not erode the ground. First, the water does not have the four foot drop. Although it does have additional pressure to what the water in the pipe 14 has due to its lower position, it also has friction loss of the water flowing through the trail tubes 26. Secondly, the hole 46 is located immediately above foot 48 and therefore, the water, when it gushes from the connector 28, gushes onto the foot 48 and runs from the foot 48 onto the ground horizontally and is not squirted vertically against the ground.

Another embodiment of this invention is seen in FIGS. 3 and 4. In this embodiment the pipe 52 is adapted to lay on the ground. The pipe 52 has an outward annular protrusion 54 extending around its perimeter. Threaded connection 56 is formed on top of the pipe 52 opening into the annular or tore-shaped passageway 58 formed between the annular protrusion 54 and annular band 60 within the pipe 52. I have had good success making the band 60 of metal and welding it as at 63 lightly to the walls of the pipe 52 on either side of the protrusion 54. Holes 62 in the bottom of the band 60 form an opening at the bottom of the pipe 52. The water which flows out of riser 64 in threaded connection 56 must flow through the hole 62. (It will be obvious to those skilled in the art that instead of using metal bands, band 60 could be made of suitable plastics and held in place by being of a snug fit rather than the necessity of having a metal band welded in.) A sprinkler (not shown in FIGS. 3 and 4) is attached to the top of the riser 64. It is not necessary that the band 60 form an absolute water tight connection. All that is necessary is that a majority of the water enter through the holes 62 so that there is sufficient velocity of water in the annular or tore-shaped passageway 58 to carry any sand into the riser 64. The passageway 58 is placed along the perimeter of the pipe 52 so that it does not appreciably obstruct the flow through the pipe. It will also be obvious that it is desirable to have the passageway 58 near a coupling or joint 65 of the pipe 52. The holes 62 are smaller than the diameter of the passageway 58. There is no way of cleaning the passageway 58 and therefore, care must be exercised that any grains of sand which enter through the holes 62 will not become clogged in the passageway. The water is accelerated as it enters the holes 62. The holes 62 are also smaller than the opening in the sprinkler, therefore the holes act as a screen to pass grains of sand which will flow through the sprinkler nozzle but retain in the pipe gravel which would clog the sprinkler nozzle.

The embodiment described in FIGS. 3 and 4 obviously requires the pipe or at least the end joints of pipes to be manufactured with the passageway. There is a great quantity of irrigation pipe now in use with threaded openings in the top to which it is desirable to provide passageways from the bottom of the pipe so that the sand is continuously removed from the pipe without the necessity of purchasing new pipe. The embodiments illustrated in FIGS. 5–9 are attachments which may be attached into pipe presently in use to convert it according to this invention.

Referring more particularly to FIGS. 5, 6, and 7, pipe 66 is shown in phantom thus illustrating that the pipe is standard pipe. The pipe 66 has threaded connection 68 at the top thereof into which is threaded riser 70 with sprinkler 72 on the top thereof. Spider 74 has threads on the outside portion thereof which are correlative to and meshed with the threads of threaded opening 68. Screw 76 extends through cross 78 of the spider 74. The screw 76 threads into cap 80 which fits below the threaded opening 68. Tube 82 has one end opening into the cap 80 and therefore fluidly connected to the threaded opening 68. The tube 82 is flat and lies close against the perimeter of the pipe 66, thus restricting the flow of water as little as possible. The tube 82 is semicircular in shape so that when one end is connected at the top of the pipe 66, the other end terminates at the bottom of the pipe. The end terminating at the bottom has a plurality of holes 84 therethrough. Again, the holes are smaller in diameter than the smallest dimension of the sprinkler 72 or passageway 86 within the tube 82 so that material which would stop up the passageway 86 or the sprinkler 72 will not flow through the holes 84. The connection between the cap 80 and the walls of the pipe 66 need not be absolutely water tight, but only sufficiently tight to prevent water flowing through that area to reduce the velocity of the water flowing through the passageway 86 below the point wherein it will carry the sand along in the water stream.

Another embodiment is illustrated in FIGS. 8 and 9 adapted to be inserted into existing pipe 66 through its threaded outlet 68 on top. Herein the tube 88 is constructed of synthetic resin plastics. It is semicircular in shape and flattened against the perimeter of the pipe 66 to offer as little resistance as possible to flow in the pipe 66.

The top end 90 of the tube 88 extends upward and into threaded opening 68. The bottom end of the tube has a plurality of holes 92 therein for the same purposes as the holes 62 and 84 in the previous embodiments. Spring steel band 94 is approximately a full circle and approximately half of it extends within the tube 88 and the other half extends through the bottom end 96 and on around the perimeter of the pipe 66. The top end of the spring band 94 which is at the top end 90 of the tube 88 has special bent section to hold the tube 88 in place. Specifically, the band 94 has portion 98 which is bent at right angles to the band 94. This portion 98 engages the internal threads of the threaded portion 68 and thereby holds the tube 88 in place.

The other end of band 94 has portion 99 which is bent and engaged with the threads of connection 68. The portion 99 is external of the tube 88 as shown in the drawings. If the connection 68 is in the middle of a pipe 66 and not convenient to one end, the plastic tube 88 which may be installed through connection 68 is particularly useful.

The embodiments shown in FIGS. 3–9 have been described as having a sprinkler which attaches to a riser and the sprinkler being above the pipe. It is not intended that these embodiments should be limited to only one sprinkler. Referring more specifically to FIG. 10, it will be seen that there could readily be additional sprinklers 100 which are attached to connectors 102 (identical to connectors 28). The connectors 102 are attached to the riser 70 by trail tubes 104.

Therefore, it may be seen that I have provided means for preventing the accumulation of sand in the bottom of an irrigation sprinkler pipe.

It will be apparent to those skilled in the art that the embodiments shown are only exemplary and that various modifications can be made in construction, materials, and arrangement within the scope of the invention as defined in the appended claims.

I claim as my invention:

1. A fluid system designed to prevent an accumulation of grains of dense material in the system comprising in combination:
   (a) a horizontal pipe adapted to carry fluid under pressure,
   (b) a plurality of passageways opening into the bottom of the pipe,
   (c) the lumen of the pipe straight and unobstructed at the area where each of the passageways opens into the pipe,
   (d) each of said passageways extending outside the lumen to a discharge opening away from the pipe,
   (e) each of said passageways being in the form of at least a portion of an annulus around the pipe from the opening into the bottom of the pipe to the discharge opening above the pipe,
   (f) each of said discharge openings discharging fluid outside the fluid system, and
   (g) the cross sectional area of each of the passageways being small enough that sufficient fluid velocity in the passageway is maintained to move the grains along with the fluid stream.

2. The invention as defined in claim 1 with the addition of
   (g) additional sprinklers,
   (h) said additional sprinklers fluidly connected to said pipe by trail tubes,
   (j) said additional sprinklers located remotely from said pipe.

3. The invention as defined in claim 1 wherein
   (g) the opening of the passageway into the pipe is by holes smaller than the passageway and smaller than the sprinklers.

4. A sprinkler irrigation system for preventing the accumulation of sand in the system comprising in combination:
   (a) a horizontal pipe adapted to carry water under pressure,
   (b) a plurality of threaded connections in the top of the pipe,
   (c) a riser threaded into each threaded connection,
   (d) said pipe having a diameter several times larger than the diameter of the riser,
   (e) the top of each riser adapted to have a sprinkler attached thereto,
   (f) a passageway extending around the perimeter of the pipe at each threaded connection,
   (g) the passageway opening into the bottom of the pipe only, and
   (h) the passageway fluidly connected to the threaded connection; the passageway formed as:
   (j) a tore-shaped protrusion in the wall of the pipe, and
   (k) an annular band within the pipe over the protrusion thus forming an annular passageway around the perimeter of the pipe between the band and the wall of the pipe,
   (m) said threaded connection opening into the protrusion, and
   (n) said opening being the form of holes through the band.

5. The invention as defined in claim 4 wherein
   (o) said holes are smaller than the passageway and smaller than the sprinkler.

6. A sprinkler irrigation system designed to prevent the accumulation of sand in the system comprising in combination:
   (a) a horizontal pipe adapted to carry water under pressure,
   (b) a plurality of threaded connections in the top of the pipe,
   (c) a riser threaded into each threaded connection,
   (d) the pipe having a diameter several times larger than the diameter of the riser,
   (e) a sprinkler attached to the top of each riser,
   (f) a tube at each threaded connection,
   (g) said tube semicircular in shape,
   (h) said tube inside the pipe around the perimeter of the pipe,
   (j) a spider threaded into the threaded connection,
   (k) a screw extending from said spider to said tube,
   (m) said tube opening into said threaded connection, and
   (n) holes in the tube at the bottom of the pipe.

7. The invention as defined in claim 6 wherein
   (o) the diameter of the holes is less than the diameter of the tube, and less than the diameter of the sprinkler.

References Cited by the Examiner

UNITED STATES PATENTS

| | | | |
|---|---|---|---|
| 629,269 | 7/1899 | Pillar | 239—143 |
| 1,478,234 | 12/1923 | Krause | 239—267 |
| 1,893,562 | 1/1933 | Paasche | 239—143 |
| 1,943,152 | 1/1934 | Weiss | 239—1 |
| 2,196,456 | 4/1940 | Charroin | 239—547 |
| 2,392,408 | 1/1946 | Radonich | 239—1 |
| 2,720,420 | 10/1955 | Seifferle | 239—104 |
| 2,760,826 | 8/1959 | Allenbaugh | 239—104 |
| 2,946,515 | 7/1960 | Jensen | 239—212 |
| 3,071,327 | 1/1963 | Cornelius | 239—212 |

FOREIGN PATENTS 624,196    5/1949    Great Britain.

EVERETT W. KIRBY, Primary Examiner.

D. L. MOSELEY, Assistant Examiner.